May 2, 1967     J. A. GILBERT     3,317,703

WELDING CIRCUIT

Filed May 23, 1963     3 Sheets-Sheet 1

INVENTOR.
JOHN A. GILBERT
BY
Christie, Parker & Hale
ATTORNEYS.

May 2, 1967  J. A. GILBERT  3,317,703
WELDING CIRCUIT
Filed May 23, 1963  3 Sheets-Sheet 2

May 2, 1967   J. A. GILBERT   3,317,703
WELDING CIRCUIT
Filed May 23, 1963   3 Sheets-Sheet 3
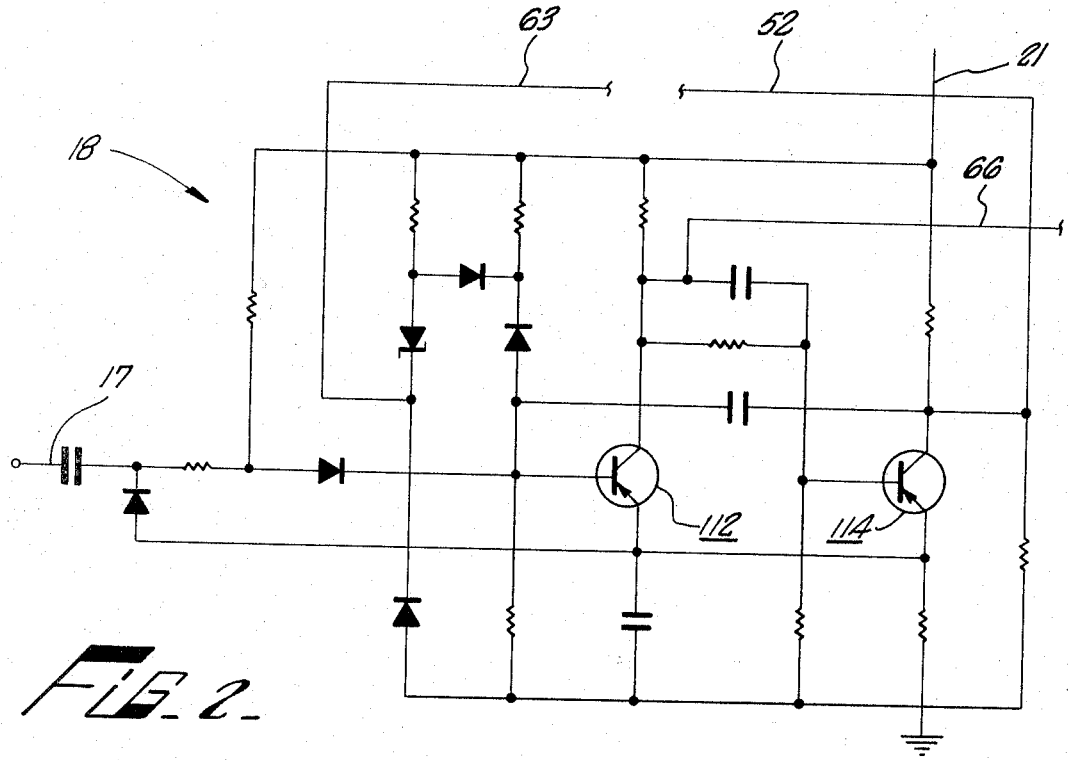
FIG_2_
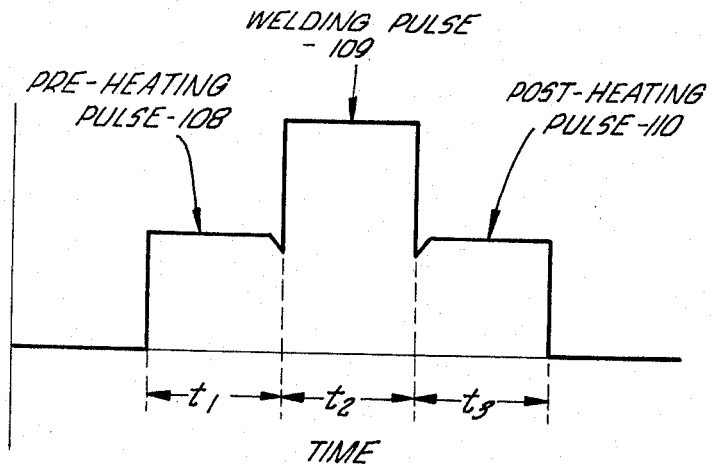
FIG_3_
INVENTOR.
JOHN A. GILBERT
BY
Christie, Parker & Hale
ATTORNEYS.

United States Patent Office 3,317,703
Patented May 2, 1967

3,317,703
WELDING CIRCUIT
John A. Gilbert, Altadena, Calif., assignor to Unitek Corporation, Monrovia, Calif., a corporation of California
Filed May 23, 1963, Ser. No. 282,753
5 Claims. (Cl. 219—111)

This invention provides an improved welding circuit, particularly of the type used in spot welding.

Two pieces of work are spot welded together by contacting the work with a pair of welding electrodes, and passing sufficient welding current through the electrodes and work so that the two pieces are welded together where they contact each other due to the heating produced by the contact resistance. In this type of welding it is often important that the welding current be carefully controlled to insure a good weld, particularly when small or delicate parts are welded together. For example, in welding microcircuits which are deposited on a glass substrate, the welding current must be carefully controlled to avoid chipping or cracking. Welding circuits prior to this invention do not provide the necessary control and fine adjustment required for many types of delicate welding operations. As a consequence, the prior art circuits often require considerable trial and error attempts which result in expensive and time-consuming setups, and there is often a substantial waste of parts to be welded.

The circuit of this invention is quickly and easily adjusted to a fine degree to provide the exact current required to weld delicate parts without cracking or chipping.

Briefly, the circuit includes a direct current source and a pair of welding electrodes. Circuit means are included for developing a first pulse of direct current from the source. Means are provided for applying the first pulse of direct current to the welding electrodes. Means are also included for developing a second pulse of direct current from the source in response to the first pulse, and means are provided for applying the second pulse to the electrodes. The first pulse preheats the weld area to avoid extreme thermal shock when the second or welding pulse is applied to the electrodes. Preferably, the second or welding pulse is followed immediately by a third or postheating pulse to prevent damage to the work from too rapid cooling.

Ordinarily, the second pulse includes more power than the first, or the third, if a third is used. Conveniently, the second pulse is higher than the first or the third pulse.

Means are preferably provided for separately adjusting the width and height of each pulse. Conveniently, the pulses are generated by a series of one shot multivibrators connected in tandem so that the end of a pulse of a preceding multivibrator triggers a following multivibrator to generate an immediately following pulse.

In one preferred embodiment two electrodes of a three electrode power amplifier transistor are coupled to a direct current energy source and a pair of welding electrodes. Means for generating a control signal is coupled to the third electrode of the power amplifier transistor, the control signal generating means being provided with means for adjusting the duration of the signal therefrom. Adjustable attenuating means are also coupled to the third transistor electrode for controlling the conduction level of the power amplifier transistor whereby energy supplied from the source to the welding electrodes is regulated to compensate for resistance variations in the work pieces to be welded.

These and other aspects of the invention will be more fully understood from the following detailed description and the accompanying drawings in which:

FIG. 2 is a schematic diagram of one of the one shot multivibrators shown schematically in FIG. 1; and FIG. 3 is a graph of typical pulses produced by the circuit of FIG. 1.

Figure 1B:
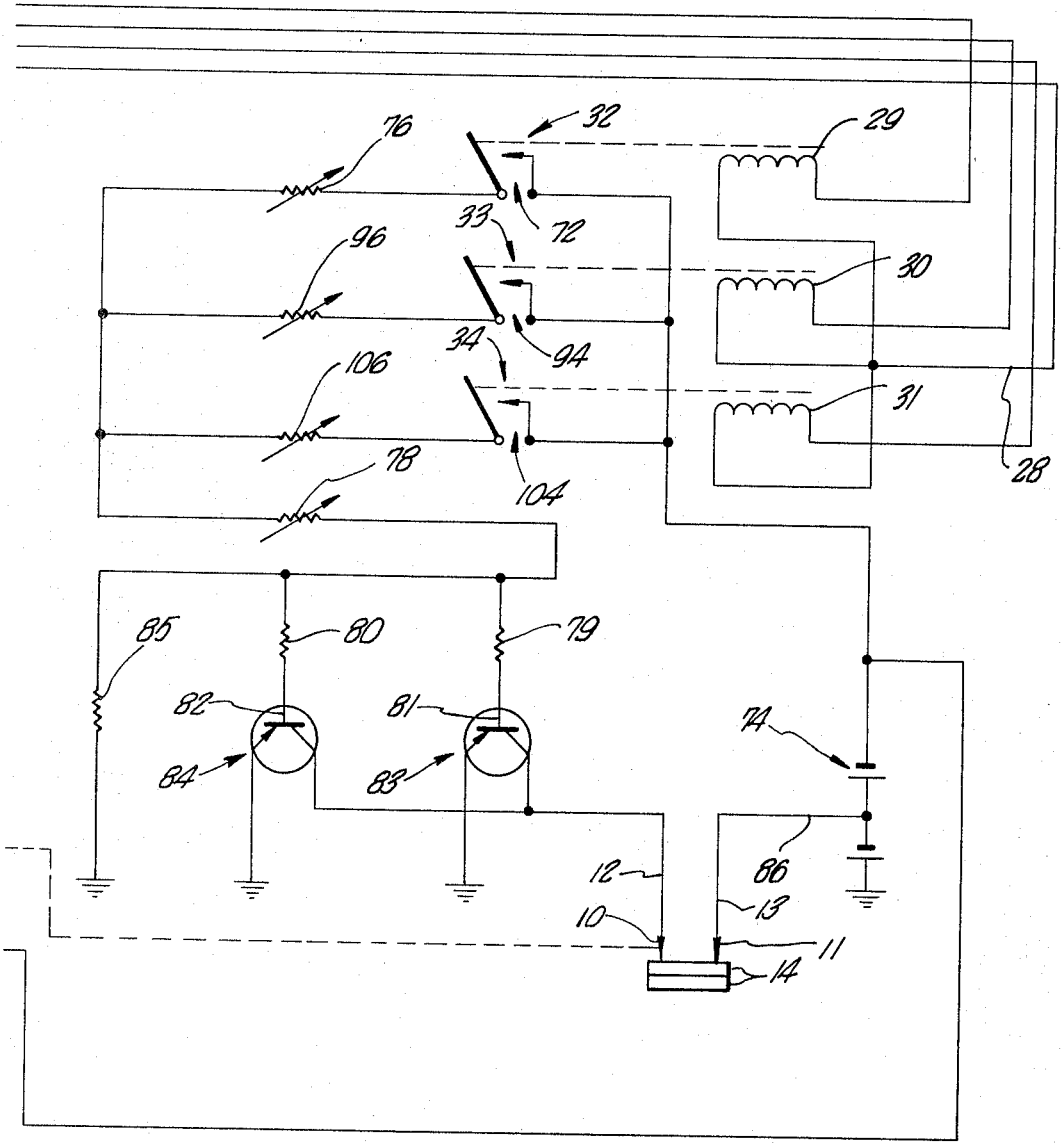
FIGS. 1A and 1B are schematic diagrams of a presently preferred circuit for generating the series of welding pulses.
Figure 1:
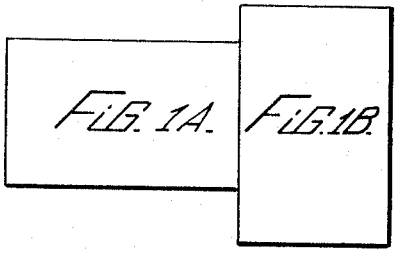
FIG. 1 is a diagram showing how FIGS. 1A and 1B should be fitted together for convenient reference.
Figure 1A:
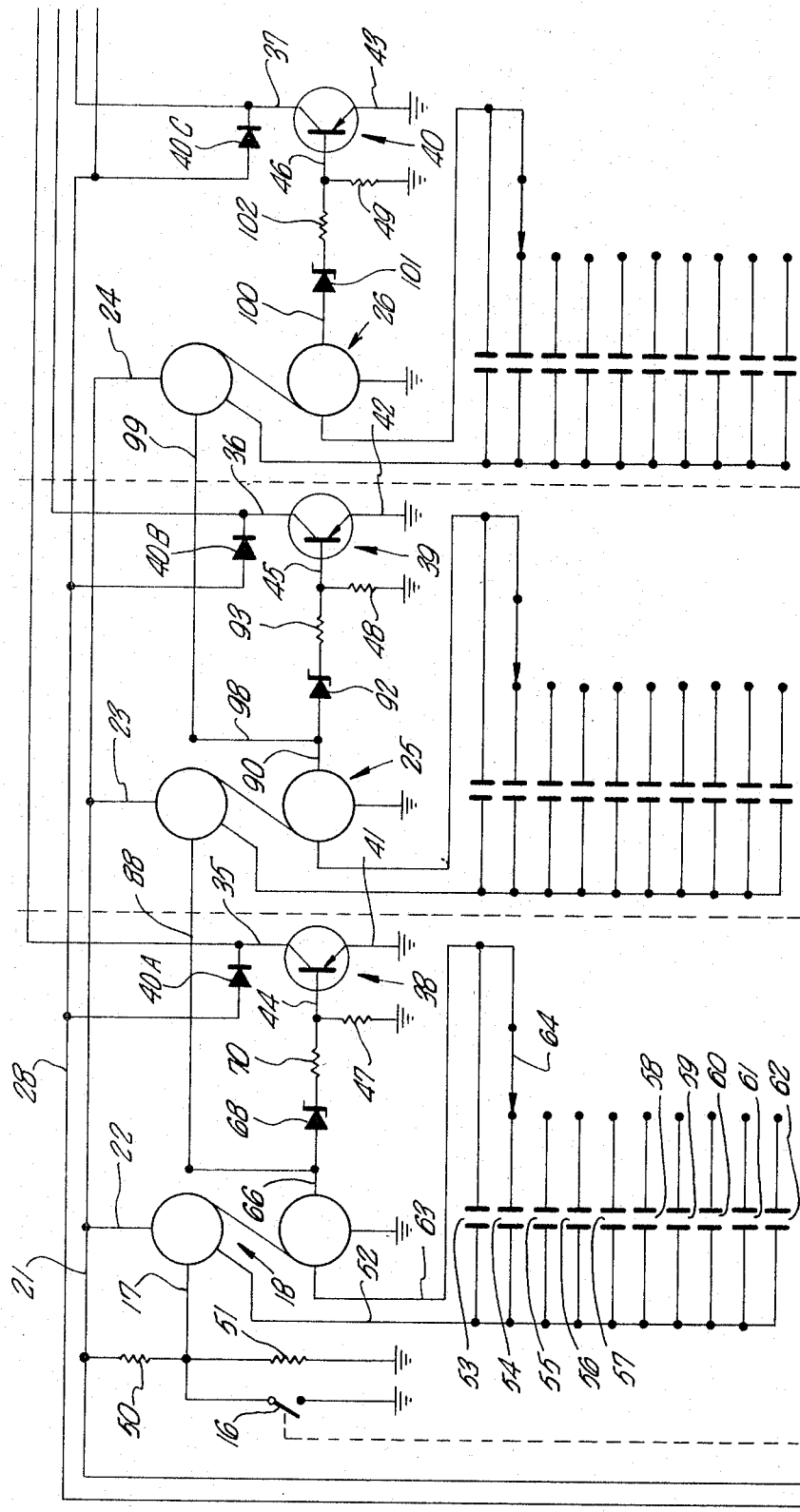

Referring to FIG. 1, a pair of welding electrodes 10 and 11 are connected to electrical leads 12 and 13, respectively. Two pieces of work 14 are disposed as shown in FIG. 1B to be spot welded together when a pulse of current passes through the electrodes. The welding pulse is developed when the welding electrodes are applied to the work with a predetermined amount of force, such as with the force-sensing arrangement disclosed in U.S. Patent 2,872,564.

When the electrodes are applied to the work with the preset force, a start pulse switch 16 is closed to apply a positive going pulse to an input 17 of a first one shot multivibrator 18, which may be conventional and is shown only schematically in FIG. 1. A detail circuit of a one shot multivibrator is shown in FIG. 2. A supply voltage, which typically may be about —12 volts, is supplied from a conventional rectifier 20 over a line 21 to the supply input terminals 22, 23, and 24, of the first one shot multivibrator 18, and second and third one shot multivibrators 25, 26, respectively.

A driving voltage, which typically may be about —17 volts, is supplied from the rectifier through a driving voltage line 28 to the common ends of three relay coils 29, 30, and 31 of the first, second, and third relays 32, 33, and 34, respectively. The opposite ends of the first, second, and third relay windings are each separately respectively connected to the collectors 35, 36, and 37 of first, second, and third transistor switches 38, 39, and 40 respectively. Diodes 40A, 40B, and 40C are connected in parallel with the relay coils 29, 30, and 31, respectively, to eliminate inductive transients and protect transistor switches 38, 39, and 40 from burn-out due to transient voltage spikes. The emitters 41, 42, and 43 of each transistor switch are each connected directly to ground, and the bases 44, 45, and 46 of the first, second and third transistor switches are each connected to ground through a resistor or through a separate resistor 47, 48, 49, respectively.

Supply voltage line 21 is connected to a pair of series-connected resistors 50, 51 which act as a voltage divider. The switch 16 is connected to the common ends of the voltage divider, which in turn are connected to the input 17 of the first one shot multivibrator.

A first timing lead 52 from the first one shot multivibrator is connected across the common sides of timing capacitors 53 through 62. A second timing lead from the one shot multivibrator is connected across the opposite side of capacitor 43 and is arranged to be connected through a switch 64 to the opposite sides of capacitors 54 through 62. Switch 64 is a rotary type which progressively picks up and shorts all contacts as it is advanced down the line. This arrangement reduces the size of the capacitor required at each position. Thus, by setting switch 64 in any one of the nine available positions, the width of the pulse developed by the one shot multivibrator can be adjusted. Conveniently, the capacitors 53 through 62 are of the range to permit the pulse width of the first one shot multivibrator to be adjustable between 5 milliseconds and 100 milliseconds.

First and second timing leads from the second and third one shot multivibrators are also connected across a bank of capacitors identical with those connected to the first one shot multivibrator so that the capacitors can be used to adjust the width of the pulses developed by the second and third one shot multivibrators. For brevity, a detailed description of the connection of the capacitors to the second and third one shot multivibrators is not repeated.

When a positive going pulse is applied to the input of the first one shot multivibrator, a negative pulse is developed on the output lead 66 of the first one shot multivibrator. The width of the pulse depends upon the setting of switch 64. With the one shot multivibrator of the type shown in FIG. 2, the voltage on the output lead 66 may change from about −3 volts to about −11 volts. This output is fed through a zener diode 68 and a resistor 70 to the base of the first transistor switch, which is turned on for a time corresponding to the width of the pulse. This pulse on the base of the first transistor switch causes it to go from normally non-conducting to full conducting so the current flows through the winding 29 of the first relay causing relay contact 72 to close and apply a pulse of voltage from a center-tapped battery 74 through a first variable attenuator resistor 76, a main variable attenuator resistor 78, and base resistors 79, 80 to the bases 81 and 82, respectively, first and second parallel-connected transistor power amplifiers 83 and 84. A biasing resistor 85 connects the two common ends of resistors 79 and 80 to ground. On receipt of the pulse through the relay contact 72, the amplifiers conduct at a level in accordance with the input pulse current level determined by the attenuators. A preheat pulse of a height depending on the setting of attenuators 76 and 78 then flows from a center-tap lead 86 of the battery through the welding electrodes, the parallel-connected transistor amplifiers, and to ground. This applies the preheating pulse to the work so it is preheated to the required temperature prior to the application of the welding pulse in response to the pulse developed by the second one shot multivibrator, whose operation will now be described.

When the first one shot multivibrator returns to its original state, the voltage on the output 66 goes from about −11 volts to −3 volts. This positive going pulse is applied to a lead 88 to the input of the second one shot multivibrator, which then develops an output pulse at its output lead 90. The width of the output pulse is determined by the setting of the control switch across the capacitors connected to the second one shot multivibrator. The pulse from the second one shot multivibrator is of ony desired height and width, depending on the nature of the work being welded. A negative going pulse from the output of the second one shot multivibrator is fed through a zener diode 92 and a resistor 93 to the base of the second transistor switch, which is then made full conducting for a time corresponding to the width of the second or welding pulse. While the second transistor switch is full conducting, current flows through the second relay winding 30 and a pair of contacts 94 in the second relay are closed so that current flows from the battery through a second variable attenuator resistor 96, the main variable attenuator resistor 78, and to the bases of the two power transistor amplifiers.

The two power transistor amplifiers conduct for the width of the second pulse, and a welding pulse of a height or amplitude depending on the setting of the second variable attenuator resistor 96 is passed through the welding electrodes and work, causing the work to be heated sufficiently to melt and fuse together. To prevent too rapid cooling of the weld and work, the circuit preferably follows the welding pulse immediately with a postheating pulse.

When the output pulse from the second one shot multivibrator is turned off, a positive going pulse is applied through a lead 98 to the input 99 of the third one shot multivibrator which is then triggered to deliver a negative pulse from its output lead 100 through a zener diode 101 and a resistor 102 to the base of the third transistor switch, which then goes full conducting for a time corresponding to the width of the output pulse from the third one shot multivibrator. While the third transistor switch is conducting, contacts 104 in the third relay close and apply current from the battery through a third variable attenuator resistor 106, and the main variable attenuator resistor 78 to the bases of the two transistor power amplifiers. This applies a postheating pulse through the electrodes and work so that the work is cooled at the desired rate to avoid cracking or chipping.

The one shot multivibrators are shown only in schematic form in FIG. 1 because they may take any one of the well known conventional forms. They may be made up of either vacuum tubes or solid state devices such as transistors. A typical one shot multivibrator which can be used in the circuit of FIG. 1 is shown in detail in FIG. 2, and the same reference numerals are used in FIG. 2 to identify the leads which correspond to those identified by the same reference numerals in FIG. 1. Two pnp transistors 112, 114 are connected as shown in FIG. 2 through conventional rectifiers, zener diodes, capacitors and resistors in a usual one shot multivibrator circuit. Input lead 17 is connected to the base of transistor 112, and output lead 66 is connected to the collector of transistor 112. First and second timing leads 52 and 63 are connected in a circuit as shown, and are the same leads used to connect across the bank of capacitors 53–62 shown in FIG. 1. Since the operation of the circuit shown in FIG. 2 is conventional, and forms no part of this invention, its description is not presented here in detail, for brevity.

The advantage of the welding circuit of this invention is that the preheat, welding, and postheating weld pulses are easily and finally adjusted in both width and amplitude by the capacitor switches or the variable attentuator resistors. Moreover, the pulses immediately follow each other with no pause or interval in between so that smooth and accurate control of the work temperature is easily obtained.

Typical preheat, welding, and postheating pulses produced by the circuit of FIG. 1 are shown in FIG. 3. The preheating pulse 108, welding pulse 109, and postheating pulse 110 are developed by the outputs of the first, second, and third one shot multivibrators, respectively. It will be observed that one pulse immediately follows the other, so there is no cooling or waiting period in between pulses. Thus, with the circuit of this invention, the work can be preheated to any desired degree, the welding temperature can be adjusted to whatever is required, and the work can be cooled or postheated independently of either the preheating or the welding temperature.

I claim:

1. A welding circuit comprising a direct current source, a pair of welding electrodes, a power amplifier transistor having an emitter, a collector and a base, means connecting the emitter, collector, welding electrodes and source in series, means for generating a control signal coupled to the base, means for adjusting the duration of the signal from the control signal generating means and adjustable attenuating means coupled to the base for controlling the conduction level of the power amplifier transistor whereby energy supplied from the source to the welding electrodes is regulated to compensate for resistance variations in the workpieces to be welded.

2. A welding circuit comprising a direct current source, a pair of welding electrodes, a power amplifier transistor having an emitter, a collector and a base, means connecting the emitter, collector, welding electrodes and source in series, adjustable attenuating means connected to the transistor base for controlling the conduction level of the power amplifier transistor, a pulse generator connected to the attenuating means, means for adjusting the duration of the pulse delivered by the pulse generator, and means for applying a pulse from the pulse generator to the base to control the current flowing to the welding electrodes whereby energy supplied from the source to the welding electrodes is regulated to compensate for resistance variations in the workpieces to be welded.

3. A welding circuit comprising a direct current energy source, a pair of welding electrodes, a power amplifier transistor having three electrodes, means coupling two of the transistor electrodes, the welding electrodes and the source, means for generating a control signal coupled to the third transistor electrode, means for adjusting the duration of the signal from the control signal generating means and adjustable attenuating means coupled to the third transistor electrode for controlling the conduction level of the power amplifier transistor whereby energy supplied from the source to the welding electrodes is regulated to compensate for resistance variations in the workpieces to be welded.

4. A welding circuit comprising a direct energy source, a pair of welding electrodes, a power amplifier transistor having three electrodes, means connecting two of the transistor electrodes, the welding electrodes and the source in series, adjustable attenuating means connected in series with the source and the third transistor electrode for controlling the conduction level of the power amplifier transistor, a pulse generator connected to the attenuating means, and means for adjusting the duration of the pulse delivered by the pulse generator whereby a pulse of a predetermined amplitude and duration is transmitted to the third transistor electrode to control the current supplied from the source to the welding electrodes and to regulate the energy supplied from the source to the electrodes to compensate for resistance variations in the workpieces to be welded.

5. A welding circuit comprising a direct current energy source, a pair of welding electrodes, a power amplifier transistor having an emitter, a collector and a base electrode, means coupling the emitter and collector electrodes, welding electrodes and the source, means for generating a control signal coupled to the base electrode, means for adjusting the duration of the signal from the control signal generating means and adjustable attenuating means connected in series with the source and the base electrode for controlling the conduction level of the power amplifier transistor whereby energy supplied from the source and the welding electrodes is regulated to compensate for resistance variations in the workpieces to be welded.

References Cited by the Examiner

UNITED STATES PATENTS

| | | | |
|---|---|---|---|
| 2,951,930 | 9/1960 | McKechnie | 219—69 |
| 3,120,619 | 2/1964 | Webb | 219—69 X |
| 3,217,207 | 11/1965 | Webb | 219—69 X |
| 3,243,567 | 3/1966 | Lobur | 219—69 |

RICHARD M. WOOD, *Primary Examiner.*

B. A. STEIN, *Assistant Examiner.*